July 5, 1966 W. J. MUNLEY, JR 3,259,662
PURIFICATION OF TRIMETHYLOLPROPANE
Filed April 2, 1962
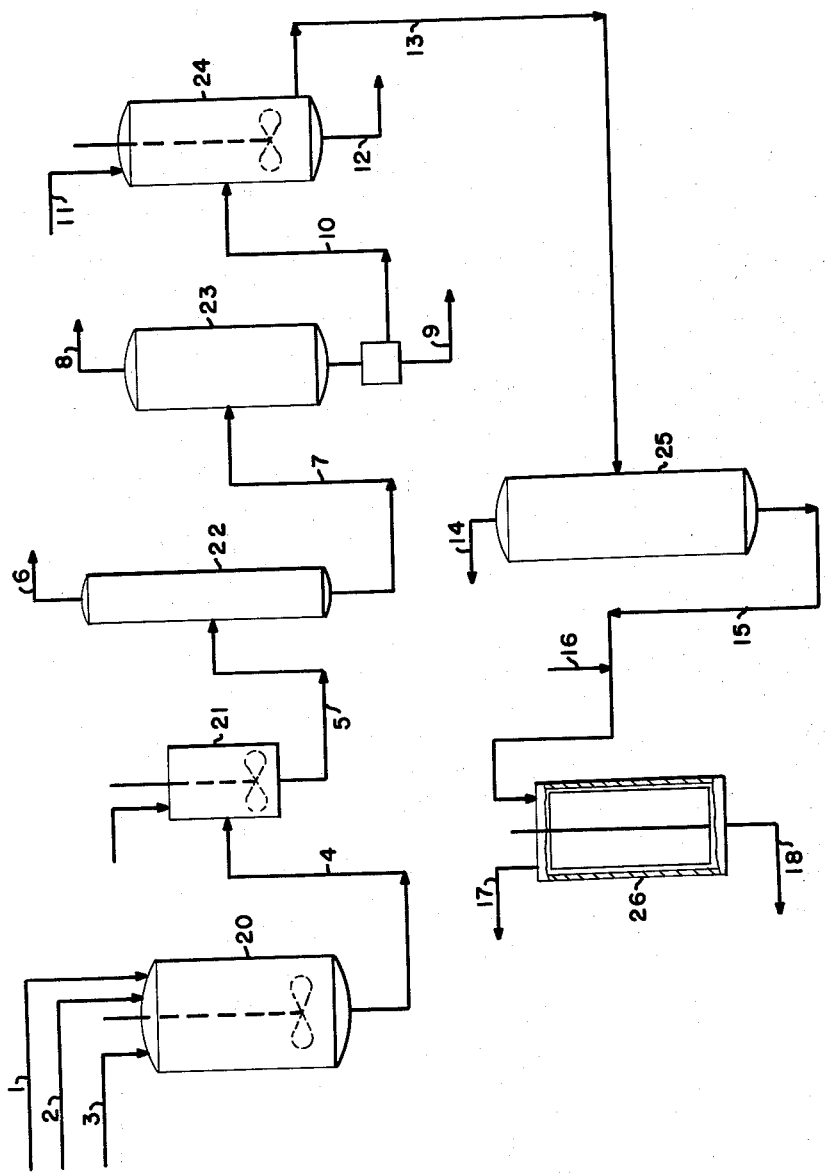
William J. Munley, Jr. Inventor
By Seymour Stahl
Patent Attorney United States Patent Office 3,259,662
Patented July 5, 1966

3,259,662
PURIFICATION OF TRIMETHYLOLPROPANE
William J. Munley, Jr., North Plainfield, N.J., assignor to Esso Research and Engineering Company, a corporation of Delaware
Filed Apr. 2, 1962, Ser. No. 184,396
10 Claims. (Cl. 260—635)

This invention relates to a process for the preparation of trimethylolpropane or neopentylglycol, and in particular to a novel distillation process for the recovery of these products.

For ease of discussion the description and examples will be directed to trimethylolpropane synthesis, it being understood that the process is applicable to the synthesis of neopentylglycol.

The preparation of trimethylolpropane is well known in the prior art and generally comprises the reaction of formaldehyde and n-butyraldehyde in the presence of alkaline material such as aqueous lime. The reaction mixture resulting from this process comprises the desired product, trimethylolpropane, a variety of light ends and other impurities and trace to minor amounts of noxious materials which are difficultly separable from the trimethylolpropane. The reaction mixture, in the conventional process for the manufacture of this product, is usually neutralized with formic acid or the like in an amount sufficient to produce an acidic pH of about 5 to 6. It is desirable at this point to reduce the pH to an acidic condition in order to permit subsequent stripping of formaldehyde without substantial degradation. Excess formaldehyde in this process is preferably removed prior to subsequent water evaporation in order to avoid side reactions usually resulting in discoloration of the trimethylolpropane. Subsequent to the formaldehyde stripping stage, the remaining reaction product mixture is then usually evaporated to dryness with the aid of an azeotrope former such as n-butanol or the like, if desired, whereupon solid calcium formate is precipitated and removed from the reaction mixture. While drying removes the bulk of the calcium and formic acid in the form of insoluble calcium formate, this salt still has sufficient solubility such that small concentrations, e.g. 0.1 to 0.5 wt. percent, on trimethylolpropane remain. The dried reaction product mixture containing the small but objectionable amounts of calcium formate is then treated with an acid which will convert the calcium to a more insoluble form. Oxalic acid is particularly useful for this purpose. Thus oxalic acid or the like is added to the dried reaction product mixture to remove the remaining quantities of calcium as calcium oxalate. The resulting calcium-free reaction product mixture is then in an acidic condition and ready for purification by distillation. The prior art has suggested that the trimethylolpropane should be distilled under acidic conditions in order to avoid degradation or decomposition of the trimethylolpropane.

It has now been found that if the reaction mixture, after acid treatment, is distilled under acidic conditions, the resulting trimethylolpropane is odoriferous in nature. The present invention relates to the discovery that a purer, less odoriferous product may be obtained by distillation in two stages under acidic and alkaline conditions. In a first stage light ends are distilled under acidic conditions. By "light ends" it is meant those products and impurities which boil below trimethylolpropane. Subsequent to the removal of the light ends, the remaining trimethylolpropane containing fraction should be distilled under alkaline conditions to obtain a reasonably pure product. Various alkaline materials such as sodium carbonate, sodium bicarbonate, or the like, may be employed to raise the pH of the crude trimethylolpropane mixture prior to the second distillation stage.

For a better understanding of the present invention, reference is now had to the attached drawing which shows a simplified flow diagram of the trimethylolpropane process. The ensuing description of the process will, for the sake of convenience, express general ranges for the reactants, temperatures, and other conditions, as well as a specific operative example thereof.

To reactor 20, which may be a simple tank-type vessel with stirring apparatus, are fed 1 to 25, e.g. 4.5, moles of formaldehyde via line 1. For this reaction a ratio of 3 moles of formaldehyde per mole of butyraldehyde is stoichiometric; however, it is generally preferred to employ a large excess of the former. The formaldehyde is added in 5–50, e.g., 20 wt. percent aqueous solution. After the formaldehyde is heated to a temperature of from 30° F. to 140° F., e.g. 122° F., at atmospheric pressure, an aqueous lime slurry is added via line 2 to raise the pH to about 9–11, e.g. 10, and 1 mole of commercial butyraldehyde is then fed into the reactor via line 3 at a constant rate for several hours. Instead of aqueous lime there may be employed any alkali metal hydroxide, or alkaline earth metal hydroxide, or other basic salt which will effectively raise the pH to within the range indicated. Examples of these preferred bases are calcium hydroxide, calcium oxide, sodium hydroxide, sodium carbonate, potassium hydroxide and other basic compounds of these metals, including lithium, magnesium, and the like. These bases are preferably added as aqueous solutions or slurries depending on their solubility.

The pH of the reaction mixture is maintained within the aforesaid range by continuously adding lime or other alkaline material to the reactor. The reaction involved is exothermic and the desired temperature of 30° F., to 140° F., e.g. 122° F., is maintained by any suitable cooling system, e.g. pumparound stream, or the like. After all of the butyraldehyde is added, the reaction product mixture is preferably allowed to soak for a period of an hour or so to effect additional reaction. The reactor contents are then passed via line 4 to a neutralizing vessel 21 wherein formic acid or its chemical equivalent is added to lower the pH to about 5 to 8, e.g. 6. Obviously in a commercial process, vessel 20 may be employed for this neutralization or acidification step. As noted, it is desirable, although not absolutely necessary, to acidify the reaction product mixture in the manner specified in order to permit subsequent distillation of the formaldehyde without substantial degradation of product. After acidification in vessel 21, the acidified mixture is passed via line 5 to a stripper tower 22 wherein excess formaldehyde is stripped from the mixture in a conventional fractionating tower via line 6, to be used as recycle formaldehyde if desired. Typical tower conditions for formaldehyde stripping are temperatures of 285° F. and pressures of 35 p.s.i.g. Excess formaldehyde must be removed prior to subsequent water evaporation to avoid degradation and discoloration of the trimethylolpropane product. The formaldehyde stripped mixture is then passed via line 7 to a water removal zone 23 wherein water is taken off overhead via line 8 by standard evaporation techniques. This distillation may be carried out at atmospheric pressures and temperatures in the order of 220° to 260° F., e.g. 250° F. Insoluble calcium formate or other formate salt precipitates out of solution and is recovered via line 9. Calcium formate, however, is slightly soluble in the reaction mixture and small amounts thereof, e.g. 0.1 to 0.5 wt. percent, will remain in the crude trimethylpropane mixture removed from vessel 23 via line 10. If desired, the water evaporation can be effected with the addition of an azeotrope former such as n-butanol, isoamyl alcohol, methyl isobutyl ketone, or the like. This not only aids in the stripping of water from the crude product, but reduces the viscosity of the partially dry trimethylolpropane mixture, thus permitting easier handling in the water evaporator. The residual calcium formate in the crude trimethylolpropane mixture is removed by the addition of oxalic acid or the like via line 11 into vessel 24. Other acids such as sodium acid sulfate, phosphoric or the like, may be employed in lieu of oxalic acid if desired. The acid should be stronger than formic so that is can spring yield an insoluble calcium salt which can be removed from the mixture. Calcium oxalate is much more insoluble than calcium formate; hence, the remaining calcium will precipitate and may be separated via line 12. Oxalic acid should be added in an amount sufficient to combine with essentially all of the residual calcium or to lower the pH of the crude mixture to about 3 to 5, e.g. 4. This mixture is then passed via line 13 for first stage distillation in light ends stripping tower 25 wherein light ends, that is product boiling below the boiling point of trimethylolpropane and including formic acid, is taken overhead via line 14 under essentially acidic distillation conditions. Tower conditions for first stage distillation include a bottoms temperature of 200° to 440° F., e.g. 375° F., and a pressure of 0.5 to 3 p.s.i.a., e.g. 1 p.s.i.a. The pH in tower 25 will vary as the distillation proceeds; however, it should be maintained between 3 to 6.5 pH until substantially all of the light ends are removed. Usually the pH will increase as distillation continues due to the removal of light organic acids, e.g. formic acid, and the like. Acid may be added during distillation to maintain the pH on the acidic side. When substantially all of the light ends have been distilled off, the trimethylolpropane-containing fraction is preferably only slightly acidic.

The amount of light ends formed in the synthesis depends to a large extent on the reaction temperatures employed as well as on the residence time in the reactor. These light ends will usually range between 5–20 wt. percent based on trimethylolpropane and consist principally of 2-ethyl-propanediol and a cyclic formal with minor to trace amounts of other impurities including residual n-butanol if such is used as an azeotrope former or water entrainer.

In addition to the light ends, heavy bottoms including unidentified polymeric products and esters of trimethylolpropane are formed. These heavier materials will be collectively termed "bottoms" for ease of discussion. The trimethylolpropane and bottoms are then passed via line 15 into a final distillation zone 26. It has been found that trimethylolpronae should be distilled in a neutral or preferably alkaline medium in order to obtain a pure, less odoriferous product. For this reason, an alkaline material, such as sodium carbonate, is passed into the crude product stream 15 via line 16 or, if desired, the alkaline material may be added directly to the distillation column. The alkaline material may be any basic salt or hydroxide of an alkali or alkaline earth metal. The particular choice is largely dependent on economics. Specific examples or alkanes materials include sodium bicarbonate, sodium hydroxide, calcium hydroxide, etc. Sufficient base should be added to maintain the trimethylolpropane fraction at a pH between 7 to 10, and preferably 8.5 during final or second stage distillation. Trimethylolpropane is then distilled under the following conditions: 300 to 550° F., e.g. 500° F. bottoms temperature at high vacuum of 5 to 50 mm. Hg, e.g. 15, to recover the pure trimethylolpropane overhead via line 17 and bottoms product via line 18. Higher or lower pressures may be employed in the distillation if desired.

At ambient conditions trimethylolpropane is a solid and in a preferred commercial process the molten trimethylolpropane from the second stage distillation would be passed to a cooling drum to crystallize or flake the pure product. This may be accomplished in accordance with procedures well known in the art.

In a preferred procedure the light ends-free trimethylolpropane containing fraction is distilled in a wiped film type evaporator. A wiped film evaporator is essentially a scraped surface evaporator of generally cylindrical shape with means for forcing the fraction to be distilled in a thin layer against the side walls of the evaporating unit in a wiping like action. The side walls of such a unit are kept hot by direct or indirect heat exchange.

The particular piece of equipment employed for the final distillation is not critical to this invention. However, it is important to distill the trimethylolpropane overhead rapidly and under as mild conditions as are economically feasible. Trimethylolpropane degrades slowly at temperatures over 480° F. and even slight degradation of product is sufficient to cause undesirable color bodies to form in the final product.

Despite the careful mild distillation conditions employed, trimethylolpropane prepared in accordance with the general process outlined above and distilled under acidic conditions has been found to contain a strong odor of butyric acid. While butyric acid, an extremely odoriferous chemical, is not employed as such in the process, n-butyraldehyde, which is a principal reactant, is unstable and oxidizes in part to butyric acid in the presence of air at room temperature. Additionally, small amounts of butyric acid may result as a by-product of the Cannizzaro reaction. In any event commercial butyraldehyde contains small but significant amounts of this contaminant.

While butyric acid boils at a substantially lower temperature than trimethylolpropane, i.e. 163.5° C. at 757 mm. Hg, distillation of the light ends from the trimethylolpropane containing fraction does not appear to completely rid the triol of butyric acid odor. Under the aforedescribed processing conditions, butyric acid contaminant reacts with trimethylolpropane to form high boiling stable esters from which trimethylolpropane can be distilled. Hence, it was surprising to find that the trimethylolpropane recovered overhead by acidic distillation was malodorous.

To determine the source of the odoriferous material, several experiments were carried out. Pure odor-free trimethylolpropane was vacuum distilled at 1–2 mm. Hg in a short path still at a maximum temperature of 333° F. No odor of butyric acid or the like was detected in the overhead and bottoms fractions. This indicated that butyric acid or other malodorous compounds are not formed by thermal degradation of the trimethylolpropane during the distillation step.

To demonstrate the advantages obtained by the employment of basic conditions in the final trimethylolpropane distillation stage the following comparison was made. A mixture of trimethylolpropane containing 66 parts per million of butyric acid was distilled. While most of the butyric acid was esterified with the trimethylolpropane, a careful analysis showed 20 parts per million of free butyric acid in the first overhead trimethylolpropane fraction. This fraction had a strong undesirable odor. In comparison, trimethylolpropane also containing 66 p.p.m. of butyric acid was then distilled under the same conditions from an alkaline medium of >7 pH prepared by the addition of 0.5% sodium bicarbonate based on trimethylolpropane. The trimethylolpropane recovered overhead was essentially odor free.

The synthesis and distillation of neopentylglycol is carried out in the same manner as described for trimethylolpropane except of course that isobutyraldehyde is employed as reactant in lieu of n-butyraldehyde. The odoriferous compound in this manufacture will be isobutyric acid.

What is claimed is:

1. In a process for the preparation of an alcohol selected from the group consisting of trimethylolpropane and neopentylglycol wherein a butyraldehyde is reacted with formaldehyde in the presence of an inorganic base and wherein the reaction mixture obtained is neutralized with acid and stripped of excess formaldehyde and subsequently acidified and the alcohol distilled therefrom, the improvement which comprises carrying out the distillation of said alcohol by first distilling light ends from said formaldehyde-stripped reaction mixture containing sad alcohol under acidic conditions and subsequently distilling said alcohol under alkaline conditions to produce an alcohol substantially free from odor as the overhead product therefrom.

2. A process in acordance with claim 1 wherein said alcohol is trimethylolpropane and said butyraldehyde is n-butyraldehyde.

3. A process in accordance with claim 1 wherein said light ends are distilled from said reaction mixture at a pH between about 3–6.5 and subsequent to the removal of said light ends an alkaline material is added to raise the pH to between 7 and 10 and said alcohol is distilled overhead within said last-named pH range.

4. In a process for the preparation of trimethylolpropane wherein n-butyraldehyde is reacted with excess formaldehyde at elevated temperatures in the presence of an inorganic base and wherein the reaction mixture obtained is neutralized and stripped of excess formaldehyde and subsequently acidified and the trimethylolpropane is separated by distillation, the improvement which comprises carrying out said distillation of said formaldehyde-stripped reaction mixture in two stages, the first stage at a pH between 3–6.5 to remove the components boiling below trimethylolpropane and the second stage at a pH between 7 and 10 to remove overhead trimethylolpropane substantially free of odor.

5. A process in accordance with claim 4 wherein the pH of the trimethylolpropane-containing residue from said first distillation stage is adjusted to between 7 and 10 by the addition of an inorganic base before distilling to remove trimethylolpropane therefrom.

6. A process for the separation of trimethylolpropane obtained by reaction of n-butyraldehyde and formaldehyde in the presence of an inorganic base which comprises neutralizing the reaction mixture obtained and stripping excess formaldehyde from said reaction mixture, adjusting the pH of said stripped reaction mixture with an organic acid to within a range of 3–6.5, distilling from said reaction mixture substantially all of the components boiling lighter than trimethylolpropane, adjusting the pH of the remaining trimethylolpropane-containing fraction with an alkaline material to within the range of 7–10 and distilling trimethylolpropane from the resulting alkaline mixture to obtain trimethylolpropane substantially free from odor overhead from said alkaline mixture.

7. A process in accordance with claim 6 wherein said inorganic base is selected from the group consisting of calcium hydroxide, calcium oxide, sodium hydroxide, sodium carbonate and potassium hydroxide.

8. A process for the separation of trimethylolpropane from a mixture containing it, light ends boiling below trimethylolpropane, bottoms boiling above trimethylolpropane and contaminated with minor amounts of butyric acid, which comprises adjusting the pH of said mixture to between 3–6.5 and distilling said light ends from said mixture, subsequently adjusting the pH of the remaining fraction to between 7 and 10 by the addition of an inorganic alkaline material and distilling trimethylolpropane from said mixture within said last-named pH range to recover trimethylolpropane product substantially free of butyric acid.

9. A process in accordance with claim 6 wherein formic acid is used to neutralize the reaction mixture preparatory to stripping excess formaldehyde and a stronger acid than formic acid is used to adjust the pH of the stripped reaction mixture preparatory to the first distillation stage for the removal of components boiling below trimethylolpropane.

10. The process as defined in claim 9 in which oxalic acid is used to adjust the pH of the stripped reaction mixture.

References Cited by the Examiner

UNITED STATES PATENTS

| | | | |
|---|---|---|---|
| 2,562,102 | 7/1951 | Jackson | 260—635 |
| 2,756,199 | 7/1956 | Smith | 202—57 |
| 2,837,468 | 6/1958 | Ruhf | 260—57 X |
| 2,930,818 | 3/1960 | Wust | 260—635 X |
| 2,960,447 | 11/1960 | Anderson et al. | 202—57 X |
| 3,076,854 | 2/1963 | Klein | 260—635 X |
| 3,082,259 | 3/1963 | Bauer et al. | 260—635 X |

NORMAN YUDKOFF, *Primary Examiner.*

J. B. DONIHEE, W. L. BASCOMB, *Assistant Examiners.*